United States Patent [19]
Sjostrom et al.

[11] Patent Number: 5,948,143
[45] Date of Patent: Sep. 7, 1999

[54] APPARATUS AND METHOD FOR THE REMOVAL OF CONTAMINANTS IN GASES

[75] Inventors: Sharon Sjostrom, Denver, Colo.; Ramsay Chang, Los Altos, Calif.

[73] Assignee: Electric Power Research Institute, Inc., Palo Alto, Calif.

[21] Appl. No.: 09/009,571

[22] Filed: Jan. 20, 1998

[51] Int. Cl.$^6$ .................................................. B01D 53/04
[52] U.S. Cl. ............................... 95/134; 55/302; 95/148; 95/280; 96/144; 96/146; 96/154
[58] Field of Search ............... 95/134, 133, 148, 95/280; 55/302, 285; 96/134, 135, 140, 141, 143, 144, 146, 154

[56] References Cited

U.S. PATENT DOCUMENTS

| | | | |
|---|---|---|---|
| 2,215,323 | 9/1940 | Guthrie | 96/146 |
| 3,608,273 | 9/1971 | Fabuss et al. | 95/148 |
| 3,693,323 | 9/1972 | Gant | 55/72 |
| 4,419,107 | 12/1983 | Roydhouse | 55/5 |
| 4,889,698 | 12/1989 | Moller et al. | 95/134 |
| 5,141,724 | 8/1992 | Audeh | 423/210 |
| 5,409,522 | 4/1995 | Durham | 75/670 |
| 5,419,884 | 5/1995 | Weekman et al. | 95/134 |
| 5,505,766 | 4/1996 | Chang | 95/134 |
| 5,628,819 | 5/1997 | Mestemaker et al. | 96/143 |

FOREIGN PATENT DOCUMENTS

| | | | |
|---|---|---|---|
| 2932274 | 2/1981 | Germany | 95/134 |

*Primary Examiner*—Duane S. Smith
*Attorney, Agent, or Firm*—William S. Galliani; Pennie & Edmonds LLP

[57] ABSTRACT

An apparatus and method are described for removing vapor phase contaminants from a gas stream by placing a porous tube having a sorbent material into ductwork through which the gas stream passes. In a first mode of operation, vapor phase contaminants are adsorbed by the sorbent. In a second mode of operation, the porous tube is cleaned of any accumulated deposits, for example fly ash, while in place without having to stop the gas flow. In a third mode of operation, the sorbent can be regenerated in place and without having to stop the gas flow by heating and collecting the desorbed contaminants. This invention is particularly suited for the removal of vapor phase mercury from flue gas generated by a combustion process.

7 Claims, 3 Drawing Sheets

APPARATUS AND METHOD FOR THE REMOVAL OF CONTAMINANTS IN GASES

BACKGROUND OF THE INVENTION

1. Field of Invention

This invention relates generally to the removal of vapor phase contaminants from a gas stream. More particularly, this invention relates to the removal of trace amounts of vapor phase air toxics, such as mercury, from the flue gas of a combustion process.

2. Description of the Related Art

The 1990 Clean Air Act Amendments, Title III, require major sources of air emissions to limit the discharge of certain chemical species. Certain of these chemical species are categorized as air toxics, and major sources are required to limit emissions to 10 tons per year for any given air toxin. Certain of these species may be present in the flue gas emitted from combustion processes, and therefore, cost-effective methods for controlling emissions of these species are of significant interest to the operators of these processes.

Air toxics and other species regulated by the 1990 Clean Air Act Amendments can be distributed in both the vapor phase and the solid phase in the flue gas from a combustion process. Typically the air toxics are concentrated in the solid phase or particulate matter and can be effectively removed by the use of a particulate collection device such as an electrostatic precipitator or fabric filter. Air toxics, such as mercury, that are present in the vapor phase are typically found in very low concentrations, for example, parts per million or less, making removal difficult.

Several approaches are currently being evaluated to remove mercury from gas streams. These techniques involve injecting sorbents into the gas stream before a particulate collection device, passing the gas stream through a fixed or fluidized sorbent bed or structure, or using a wet scrubbing system.

Approaches using fixed bed technologies normally pass the mercury containing gas through a bed consisting of sorbent particles or various structures such as honeycombs, screens and fibers that are coated with sorbents. Common sorbents include activated carbon and noble metals such as gold and silver. In many cases where noble metals are used, only the surface layer of the structure is coated with the noble metal sorbent while the structure itself is made of ceramic or metallic materials. The sorbents on these fixed structures can be periodically regenerated by heating the structure and driving off the adsorbed mercury. The mercury driven off can be recovered or removed separately.

There are, however, several disadvantages of such fixed bed systems. Gas streams such as those from power plant coal combustion contain significant fly ash which can plug the bed structures and thus the beds need to be removed frequently from operation for cleaning. Alternatively, these beds will have to be located downstream of a separate particulate collector. The beds will also have to be taken off line periodically for regeneration, thereby necessitating a second bed to remain on-line while the first one is regenerating. These beds also require significant space and are very difficult to retrofit into existing systems. For example, retrofitting such a system into the existing ductwork of a power plant could require major structural modifications.

In view of the foregoing, there exists a need for an improved method for removing vapor phase contaminants, such as mercury, from a gas stream.

SUMMARY OF THE INVENTION

An apparatus and method are described for removing vapor phase contaminants from a gas stream by placing a porous tube containing a sorbent material into ductwork through which the gas stream is passing. In a first mode of operation, vapor phase contaminants are adsorbed by the sorbent. In a second mode of operation, the porous tube is cleaned of any accumulated deposits, for example fly ash, while in place without having to stop the gas flow by back pulsing the tube. In a third mode of operation, the sorbent can be regenerated in place and without having to stop the gas flow by heating and collecting the desorbed contaminants. This invention is particularly suited for the removal of vapor phase mercury from flue gas generated by a combustion process.

This invention circumvents significant problems associated with typical fixed bed mercury adsorption systems. Because the porous tubes can be cleaned on-line, the tubes do not need to be removed for cleaning. On-line cleaning also obviates the need for a separate particulate collector that is sometimes used upstream of some fixed bed systems to avoid the need to clean accumulated deposits. The ability to regenerate the sorbent on-line avoids the need for a second fixed bed that is typically used while the first bed is being regenerated. In addition, the present invention requires little or no additional space for installation. All of these advantages can result in significant capital and operating cost savings.

DETAILED DESCRIPTION OF THE INVENTION

Figure 1:
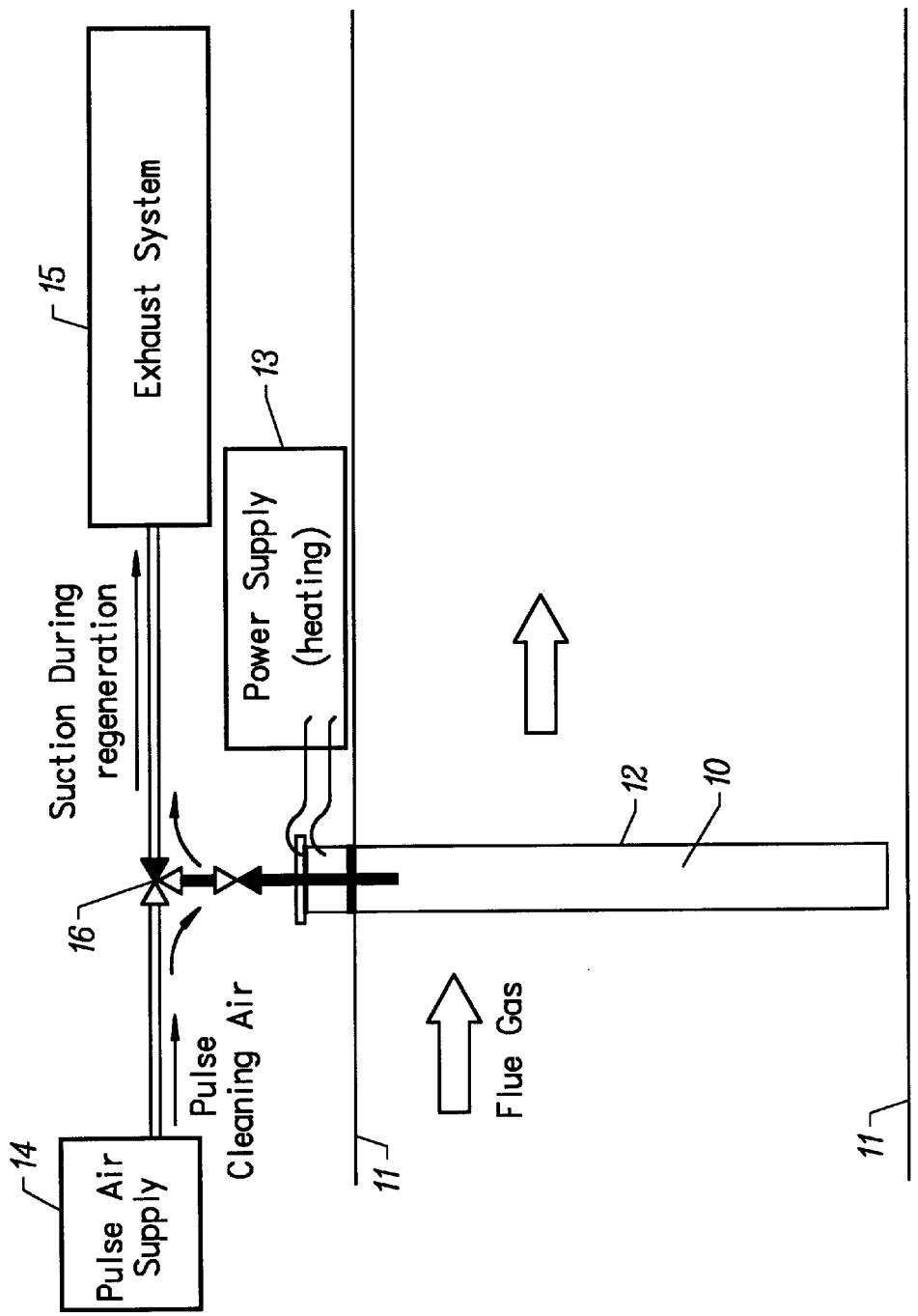
FIG. 1 is a side view of an apparatus for removing vapor phase contaminants from a gas stream in accordance with an embodiment of the present invention.
Figure 2:
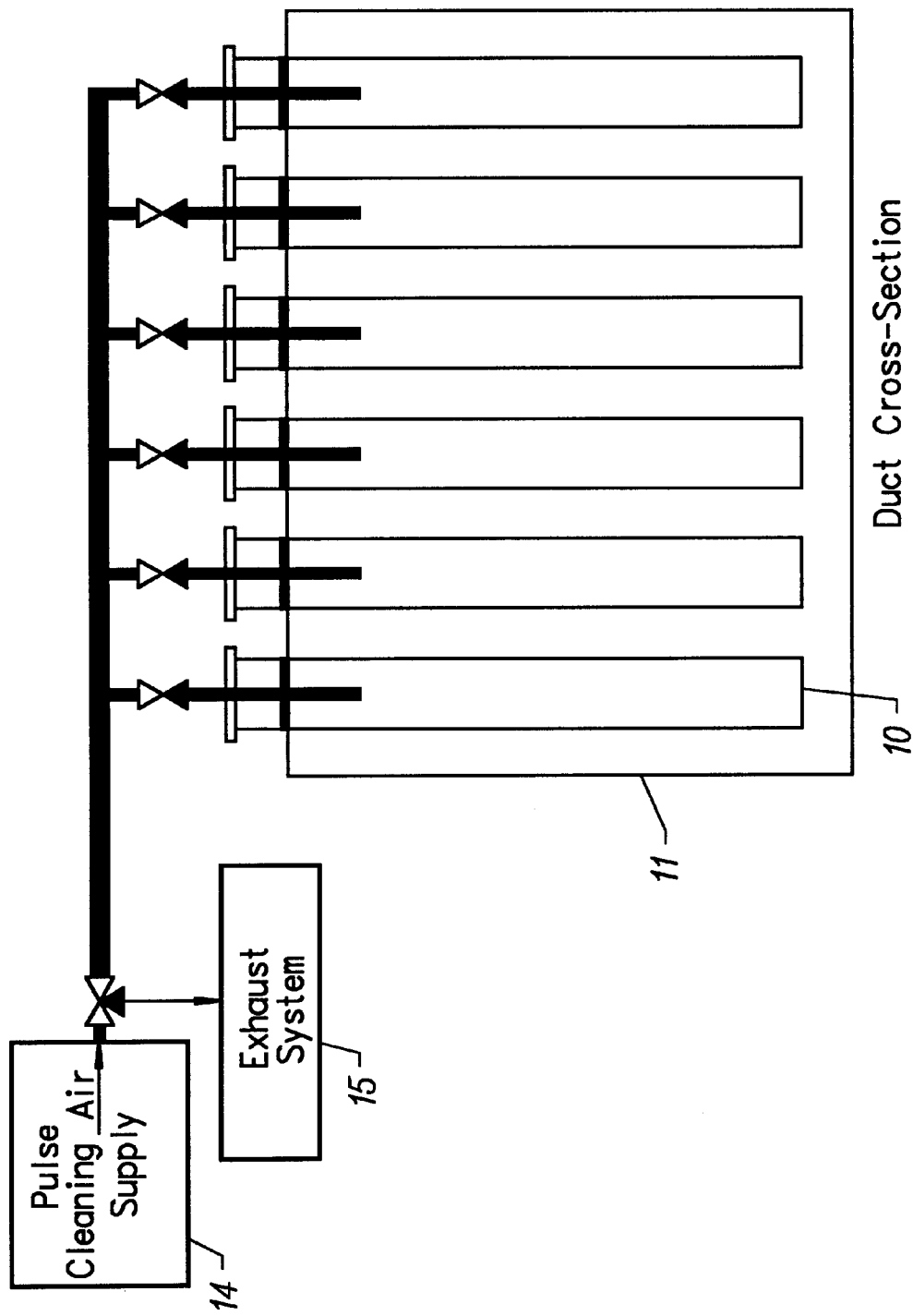
FIG. 2 is a sectional view of an apparatus for removing vapor phase contaminants from a gas stream in accordance with an embodiment of the present invention.

FIG. 1 shows porous tube (10) extending into duct (11) through which flue gas is passed. Porous tube (10) is coated with a sorbent (12), such as activated carbon, capable of adsorbing vapor phase contaminants, such as mercury. Power supply (13) is connected to porous tube (10) to provide power for heating porous tube (10). Pulse air supply (14) is connected to porous tube (10) to allow pulse air to pass into the interior of porous tube (10) and through the wall of porous tube (10) into duct (11). Exhaust system (15) is connected to porous tube (10) to allow gas inside duct (11) to pass through the wall of porous tube (10) to exhaust system (15). Both pulse air supply (14) and exhaust system (15) are connected to porous tube (10) with the use of three-way valve (16). It should be appreciated that pulse air supply (14) and exhaust system (15) can be connected to porous tube (10) in any manner as long as there is a mechanism to control gas flow from pulse air supply (14) and to exhaust system (15). FIG. 2 shows a sectional view of multiple porous tubes (10) all connected to the same pulse air supply (14) and exhaust system (15).

Figure 3:
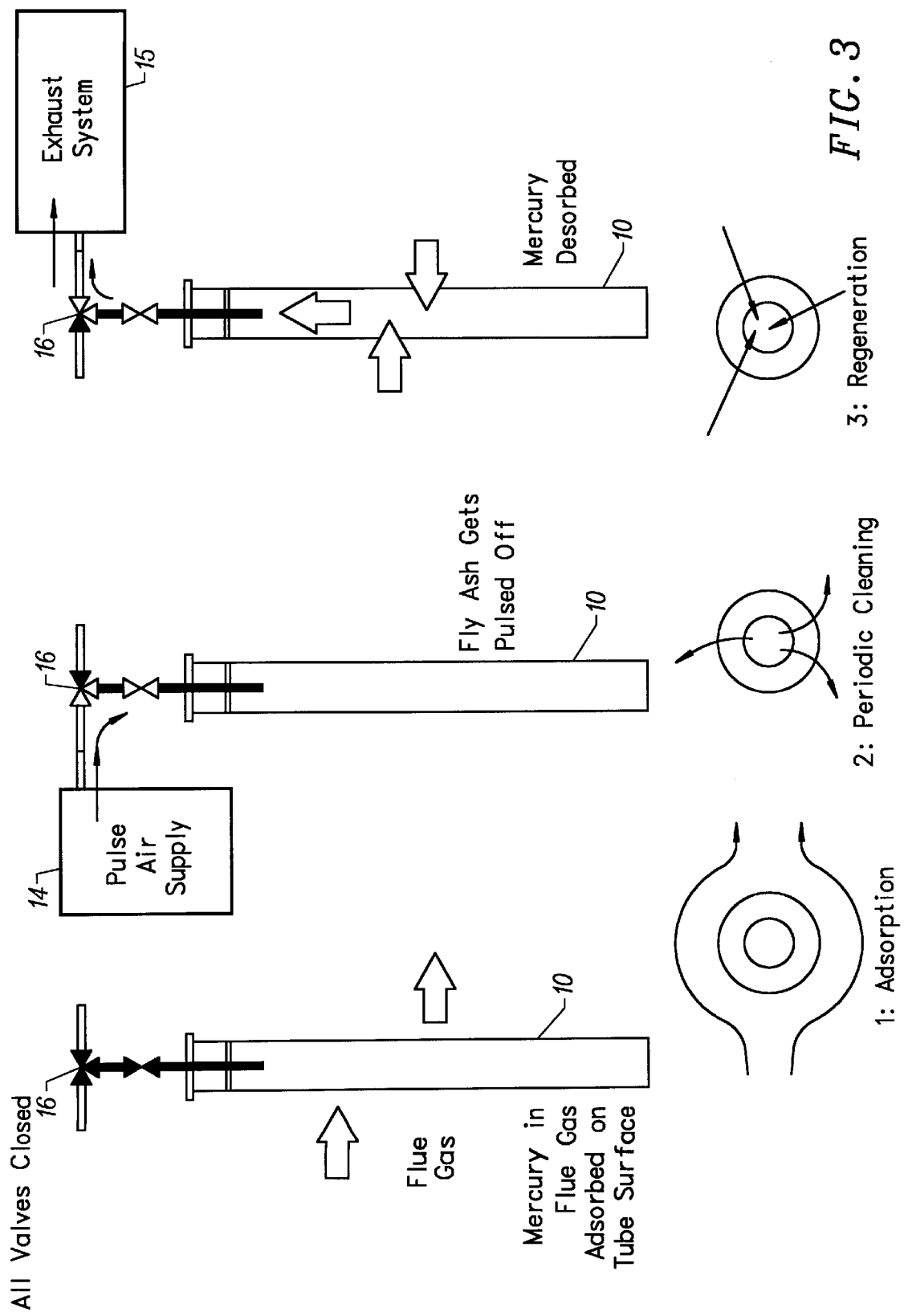
FIG. 3 is a diagram of the three operating modes of an apparatus for removing vapor phase contaminants from a gas stream in accordance with an embodiment of the present invention.

FIG. 3 shows the three operating modes of the present invention. For each mode a front view and a top view of porous tube (10), and tubing and valving associated with pulse air supply (14) and exhaust system (15), is shown. In addition, the direction of flue gas flow and pulse air flow are shown. Step 1 is Adsorption of the vapor phase contaminant.

Step 2 is Periodic Cleaning of porous tube (10) using pulse air, and Step 3 is Regeneration of sorbent (12).

In operation and use, the method of the present invention comprises the steps of adsorbing the vapor phase contaminant from the gas stream, using pulse air to clean porous tube (10) and regenerating sorbent (12). It should be appreciated that these steps can be performed in any order and at any time, and conventional control methods can be used to regulate when these steps are performed and the duration for each. It should be appreciated that multiple porous tubes (10) can be used to provide for greater contact between the contaminants and the sorbent (12) to enhance the adsorption efficiency and to allow continued adsorption while some porous tubes (10) are either cleaned or regenerated. Conventional control methods can also be used to regulate which porous tubes (10) are operating in which mode, at what time and for what duration.

Further, it should be appreciated that the present invention can be used to remove many different vapor phase contaminants; however, the process is particularly suited for the removal of vapor phase mercury from the flue gas of a combustion process. Therefore, but without limiting the application and uses of the present invention for the removal of other vapor phase contaminants and for other gas streams, the description that follows is directed to the specific use of the present invention for the removal of vapor phase mercury from a flue gas of a combustion process.

To adsorb vapor phase mercury from a flue gas, porous tube (10), which is coated with sorbent (12) such as gold, silver, activated carbon and selenium, is placed into the ductwork (11) transporting the flue gas. Porous tube (10) can be located anywhere in the duct (11) where vapor phase contaminant removal can be optimized, including the stack of the combustion process. During adsorption, no gas will actually flow through porous tube (10) as all outlets to it are closed. Mercury is adsorbed by sorbent (12) coated on the surface of porous tube (10) as the flue gas passes by porous tube (10). This is shown in FIG. 3. as Adsorption. It should be appreciated that any sorbent can be used and that any method for coating porous tube (10) with such sorbent can be used. Further, it may be possible to make porous tube (10) out of a material that itself acts as a sorbent, such as activated carbon. Porous tube (10), however, should be made of a material capable of withstanding the flue gas environment in which it is located.

As the surface of porous tube (10) gets fouled with dust particles from the gas stream, a periodic back pulse of air can be released into porous tube (10) to knock the dust off the outside of porous tube (10). This is accomplished by using pulse air supply (14). Three-way valve (16) is opened to allow pulse air, which is supplied at a higher pressure than the flue gas by pulse air supply (14), to flow from the interior of porous tube (10), through its wall and into the flue gas, thereby dislodging accumulated dust particles, this is shown in FIG. 3. as Periodic Cleaning. It should be appreciated that other methods of supplying a stream of air into the interior of porous tube (10), such as a reverse flow of air, can also be used.

As the surfaces of sorbent (12) become saturated from the adsorption of mercury, porous tube (10) can be regenerated without removing it from duct (11) or without having to divert the flue gas flow. This is accomplished by electrically heating porous tube (10) using power supply (13) either by direct electrical conduction through the tube or by indirect heating through electrical heating elements. It should be appreciated that other means of heating porous tube (10), such as the use of microwave energy or passage of a hot gas stream through the tubes, may also be used. While heating, suction is applied to the inside of porous tube (10) using exhaust system (15). This suction will pull flue gas through the wall of porous tube (10) and be sent to exhaust system (15). Mercury will desorb from sorbent (12) during heating and will be collected by exhaust system (15). This is shown in FIG. 3. as Regeneration. It should be appreciated that exhaust system (15) can be any method for recovering vapor phase contaminants from a small gas stream. For example, in the case of mercury, exhaust system (15) can be a condenser that condenses the vapor phase mercury for collection and disposal.

An apparatus and method for removing vapor phase contaminants from a gas stream has been described. The present invention has significant advantages over conventional fixed bed systems and other methods for removing vapor phase contaminants.

We claim:

1. A method for removing a vapor phase contaminant from a contaminated gas stream in a duct, said method comprising the steps of:

adsorbing a vapor phase contaminant of a contaminated gas stream onto a sorbent material on a porous tube;

cleaning said porous tube while the contaminated gas stream continues to flow in the duct;

regenerating said sorbent material while the contaminated gas stream continues to flow in the duct by heating said sorbent material and passing a portion of the contaminated gas stream into the interior of said porous tube and out of the duct; and collecting said vapor phase contaminant from said portion of the contaminated gas stream.

2. The method of claim 1 wherein said cleaning step includes the step of cleaning said porous tube by passing a cleaning gas from the exterior of the duct to the interior of said porous tube and through the wall of said porous tube into the duct.

3. The method of claim 2 wherein said cleaning step includes the step of cleaning said porous tube by passing a cleaning gas in pulses from the exterior of the duct to the interior of said porous tube and through the wall of said porous tube into the duct.

4. The method of claim 1 wherein said regenerating step includes the step of regenerating said sorbent material by heating said sorbent material electrically.

5. The method of claim 1 wherein said regenerating step includes the step of regenerating said sorbent material by heating said sorbent material by directing microwave energy to said porous tube.

6. The method of claim 1 wherein said collecting step includes the step of collecting said vapor phase contaminant by condensing said vapor phase contaminant.

7. The method of claim 1 wherein said collecting step includes the step of collecting said vapor phase contaminant by absorbing said vapor phase contaminant.

* * * * *